United States Patent
Ahn

(10) Patent No.: US 10,976,490 B2
(45) Date of Patent: Apr. 13, 2021

(54) OPTOELECTRONIC DEVICE AND METHOD OF MANUFACTURING THE SAME

(71) Applicant: KOOKMIN UNIVERSITY INDUSTRY-ACADEMIC COOPERATION FOUNDATION, Seoul (KR)

(72) Inventor: Donghwan Ahn, Seoul (KR)

(73) Assignee: KOOKMIN UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 16/353,561

(22) Filed: Mar. 14, 2019

(65) Prior Publication Data
US 2020/0200970 A1    Jun. 25, 2020

(30) Foreign Application Priority Data

Dec. 19, 2018 (KR) .......................... 10-2018-0165097

(51) Int. Cl.
G02B 6/12     (2006.01)
G02B 6/13     (2006.01)

(52) U.S. Cl.
CPC .......... *G02B 6/12004* (2013.01); *G02B 6/13* (2013.01); *G02B 2006/12061* (2013.01); *G02B 2006/12142* (2013.01)

(58) Field of Classification Search
None
See application file for complete search history.

(56) References Cited

U.S. PATENT DOCUMENTS

| 7,603,016 B1* | 10/2009 | Soref ................ B82Y 20/00 |
| | | 385/129 |
| 2006/0039653 A1 | 2/2006 | Painter et al. |
| 2007/0116398 A1 | 5/2007 | Pan et al. |
| 2010/0330727 A1 | 12/2010 | Hill et al. |
| 2017/0199037 A1* | 7/2017 | Jain .................... G02B 6/1225 |
| 2018/0039022 A1 | 2/2018 | Ahn et al. |
| 2018/0217469 A1* | 8/2018 | Yu ...................... G02F 1/2257 |
| 2018/0373067 A1* | 12/2018 | Fujikata ................. G02F 1/025 |

FOREIGN PATENT DOCUMENTS

KR    10-2018-0053286 A    5/2018
KR    10-2018-0078003 A    7/2018

OTHER PUBLICATIONS

Notification of Reason for Refusal dated Sep. 21, 2020 from the Korean Intellectual Property Office in Application No. 10-2018-0165097.

* cited by examiner

*Primary Examiner* — Chad H Smith
(74) *Attorney, Agent, or Firm* — Sughrue Mion, PLLC

(57) ABSTRACT

There is provided an optoelectronic device including: first and second optical waveguides arranged on a bulk silicon substrate to be spaced apart from each other in a first direction parallel to an upper surface of the bulk silicon substrate; and an active region interposed between the first and second optical waveguides on the bulk silicon substrate such that one side of the active region contacts the first optical waveguide and the other side contacts the second optical waveguide portion, wherein the first and second optical waveguides and the active region include germanium-silicon (GeSi) alloy.

9 Claims, 11 Drawing Sheets

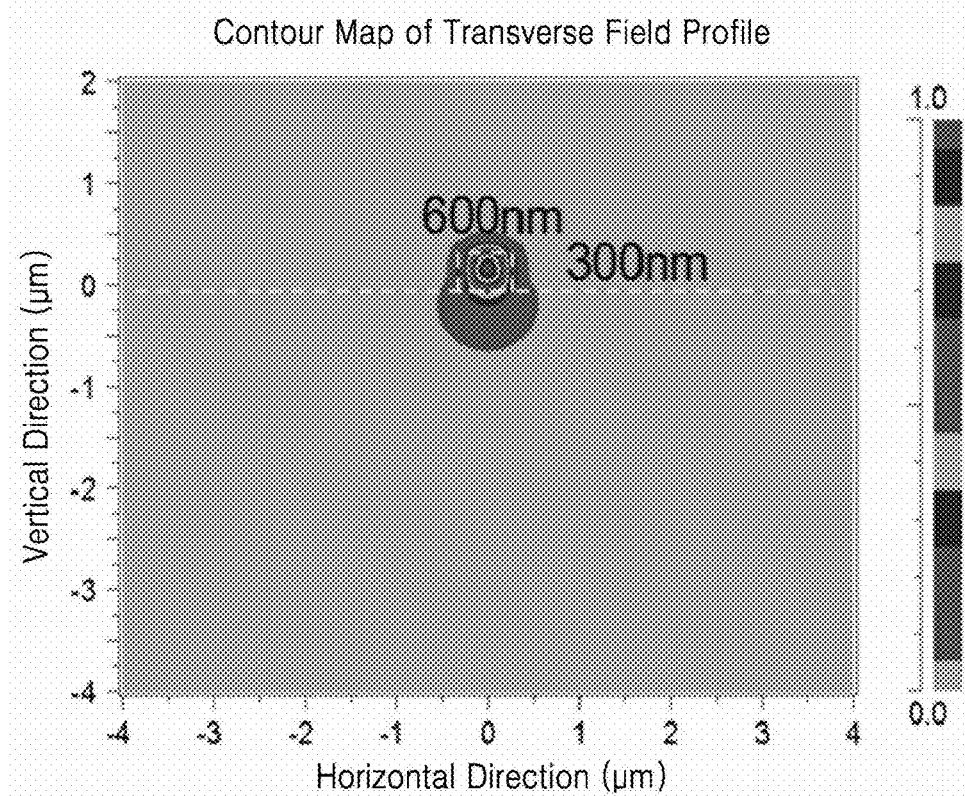

OPTOELECTRONIC DEVICE AND METHOD OF MANUFACTURING THE SAME

CROSS-REFERENCE TO RELATED APPLICATIONS

This application claims the benefit of Korean Patent Application No. 10-2018-0165097, filed on Dec. 19, 2018, in the Korean Intellectual Property Office, the disclosure of which is incorporated herein in its entirety by reference.

BACKGROUND

1. Field

The inventive concept relates to an optoelectronic device and a method of manufacturing the same, and more particularly, to an optoelectronic device integrated with a passive optical device and an active optical device based on germanium-silicon (GeSi)/Si and a method of manufacturing the same.

2. Description of the Related Art

In general, a silicon (Si) based modulator has been widely used as an optoelectronic device. However, due to an indirect band gap characteristic of Si, Si material is usually poor and inappropriate for forming an electro-absorption modulator. Instead, Si-based Mach-Zehnder type and resonator-type electro-optic modulators are being used, but the Mach-Zehnder type modulator has a problem of large device size due to silicon's small electro-optic coefficient and the resonator-type electro-optic modulator has a problem of low variation-tolerance. To solve this problem, there is an increasing tendency to use germanium-silicon (GeSi) based optoelectronic devices which may reduce a difference between a direct band gap and the indirect band gap and may have great electro-absorption characteristics such as Franz-Keldysh effect.

The GeSi-based optoelectronic device needs to have a relatively short active region because some residual absorption due to the indirect band gap characteristic inevitably causes optical loss. Since the GeSi-based optoelectronic device also has a relatively high refractive index and a small single mode dimension, the optical loss needs to be minimized when the active region is combined with an optical waveguide.

Meanwhile, a silicon on insulator (SOI) substrate is mainly being used in manufacturing a Si-based optoelectronic device. A Si-based waveguide structure requires a lower cladding layer for the confinement of the light mode within the device and the SOI substrate is mainly used because the buried oxide in the SOI substrate may serve as a lower cladding for upper devices.

However, the SOI substrate is about 10 times more expensive than the bulk silicon substrate, resulting in an increase in the manufacturing cost. Furthermore, because the common electronic integrated circuit (IC) chip is normally fabricated on bulk Si substrate, the optoelectronic devices designed on the SOI substrate cannot be fabricated and integrated together with electronic integrated-circuit (IC) chip.

In contrast, the design of germanium-silicon (GeSi) alloy based optoelectronic devices built on bulk Si substrate can enable and facilitate the monolithic integration and introduction of photonic devices into electronic chips for the applications such as optical interconnect in semiconductor chips.

SUMMARY

The inventive concept is directed to an optoelectronic device that minimizes optical loss and reduces a manufacturing cost with a simplified process and a method of manufacturing the optoelectronic device.

Additional aspects will be set forth in part in the description which follows and, in part, will be apparent from the description, or may be learned by practice of the presented embodiments.

According to an aspect of the inventive concept, there is provided an optoelectronic device includes: first and second optical waveguides arranged on a bulk silicon substrate to be spaced apart from each other in a first direction parallel to an upper surface of the bulk silicon substrate; and an active region interposed between the first and second optical waveguides on the bulk silicon substrate such that one side of the active region contacts the first optical waveguide and the other side contacts the second optical waveguide portion, wherein the first and second optical waveguides and the active region comprise germanium-silicon (GeSi) alloy.

According to an exemplary embodiment, at least one of the first and second optical waveguides and the active region may include GeSi alloy of different composition ratios, respectively.

According to an exemplary embodiment, Si content of at least one of the first and second optical waveguides may be greater than Si content of the active region.

According to an exemplary embodiment, the optoelectronic device may further include buffer layers interposed between one side of the active region and the first optical waveguide and between the other side of the active region and the second optical waveguide.

According to an exemplary embodiment, at least one of the first and second optical waveguides and the active region may include GeSi alloy having the same composition ratio.

According to an exemplary embodiment, a length of the active region in the first direction may be about 5 µm to about 300 µm.

According to an exemplary embodiment, a cross section perpendicular to the first direction of at least one of the first and second optical waveguides may be symmetrical with a cross section perpendicular to the first direction of the active region.

According to an exemplary embodiment, in a cross section perpendicular to the first direction of each of at least one of the first and second optical waveguides and the active region, a width of the cross section in a second direction orthogonal to the first direction may be constant in a third direction perpendicular to the upper surface of the bulk silicon substrate.

According to an exemplary embodiment, in a cross section perpendicular to the first direction of each of at least one of the first and second optical waveguides and the active region, a width of the cross section in a second direction orthogonal to the first direction may vary in a third direction perpendicular to the upper surface of the bulk silicon substrate.

According to an exemplary embodiment, the optoelectronic device may further include a first contact electrode in contact with an upper surface of the active region and connected to a first extension electrode for applying a bias voltage to the active region or for detecting light passing through the active region.

According to an exemplary embodiment, the optoelectronic device may further include a second contact electrode, which is formed on the bulk silicon substrate, in contact with a lower surface of the active region and connected to a second extension electrode for applying a bias voltage to the active region or for detecting light passing through the active region.

According to an exemplary embodiment, the optoelectronic device may further include first and second contact electrodes extended from each side of the active region to the bulk silicon substrate and connected to first and second extension electrodes for applying a bias voltage to the active region or for detecting light passing through the active region.

According to another aspect of the inventive concept, there is provided a method of manufacturing an optoelectronic device includes: forming a structure, which is on a bulk silicon substrate, extending in one direction parallel to an upper surface of the bulk silicon substrate and comprising a first semiconductor compound; forming an insulating layer covering the upper surface of the bulk silicon substrate and the structure; defining first and second optical waveguides by removing a portion of the insulating layer and the structure to expose a portion of the upper surface of the bulk silicon substrate and inner walls of the structure; and forming an active region that covers the upper surface of the bulk silicon substrate and the inner walls of the structure that are exposed between the first and second optical waveguides and comprises a second semiconductor compound.

According to an exemplary embodiment, the method may further include forming a buffer layer on the inner walls of the structure before the forming of the active region after the defining of the first and second optical waveguides, wherein the forming of the active region may include forming the active region so as to cover at least a portion of the upper surface of the bulk silicon substrate and the buffer layer.

BRIEF DESCRIPTION OF THE FIGURES

These and/or other aspects will become apparent and more readily appreciated from the following description of the embodiments, taken in conjunction with the accompanying drawings in which:

FIG. 5B is a result of electromagnetic wave simulation performed on the optoelectronic device of FIG. 1;

DETAILED DESCRIPTION OF EXEMPLARY EMBODIMENTS

Figure 1:
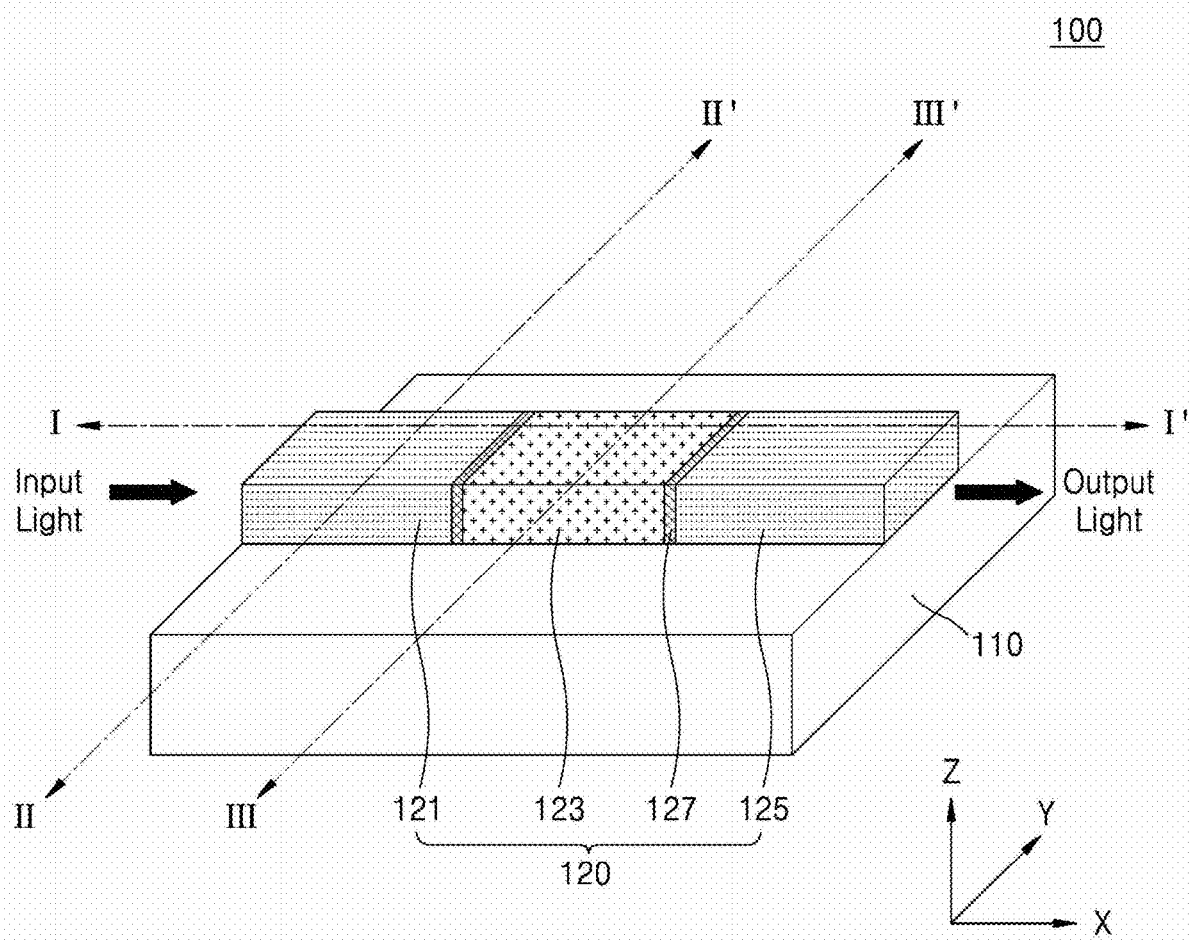
FIG. 1 is a perspective view of a main portion of an optoelectronic device according to an embodiment of the inventive concept.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that, although the terms first, second, etc. may be used herein to describe various members, components, regions, layers, and/or sections, these members, components, regions, layers, and/or sections should not be limited by these terms. These terms do not denote any order, quantity, or importance, but rather are only used to distinguish one component, region, layer, and/or section from another component, region, layer, and/or section. Thus, a first member, component, region, layer, or section discussed below could be termed a second member, component, region, layer, or section without departing from the teachings of embodiments. For example, as long as within the scope of this disclosure, a first component may be named as a second component, and a second component may be named as a first component.

Unless otherwise defined, all terms (including technical and scientific terms) used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When a certain embodiment may be implemented differently, a specific process order may be performed differently from the described order. For example, two consecutively described processes may be performed substantially at the same time or performed in an order opposite to the described order.

In the drawings, variations from the illustrated shapes may be expected as a result of, for example, manufacturing techniques and/or tolerances. Thus, the embodiments of the inventive concept should not be construed as being limited to the particular shapes of regions illustrated herein but may include deviations in shapes that result, for example, from manufacturing processes Like reference numerals in the drawings denote like elements, and thus their overlapped explanations are omitted.

As used herein, the term "and/or" includes any and all combinations of one or more of the associated listed items.

Hereinafter, embodiments of the inventive concept will be described in detail with reference to the accompanying drawings.

Figure 2A:
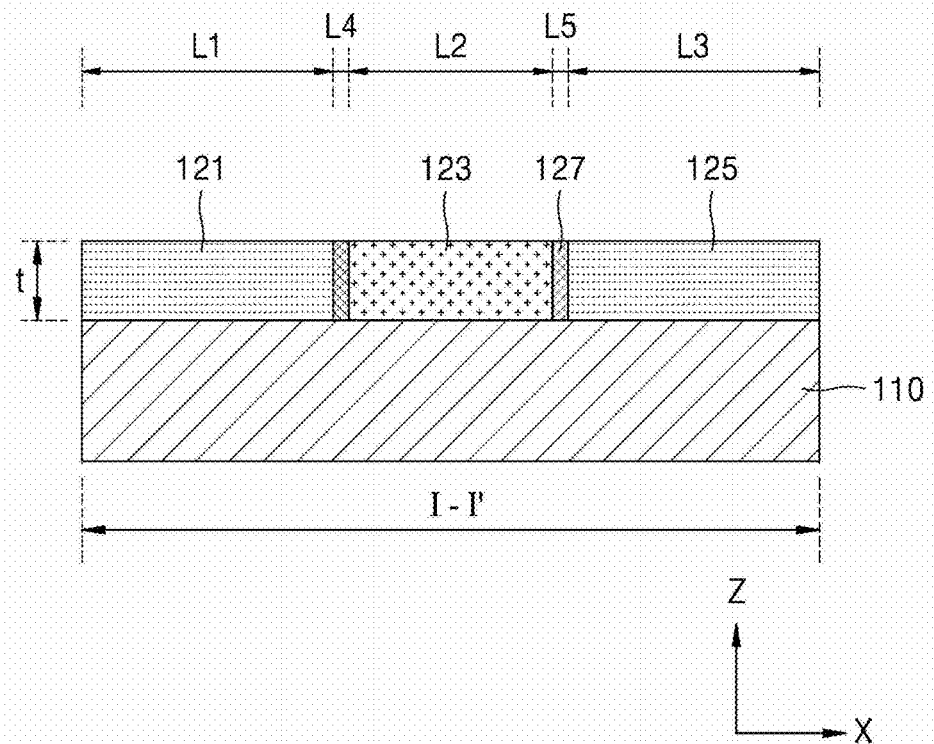
FIG. 2A is a cross-sectional view of the optoelectronic device of FIG. 1 taken along line I-I'.
Figure 2B:
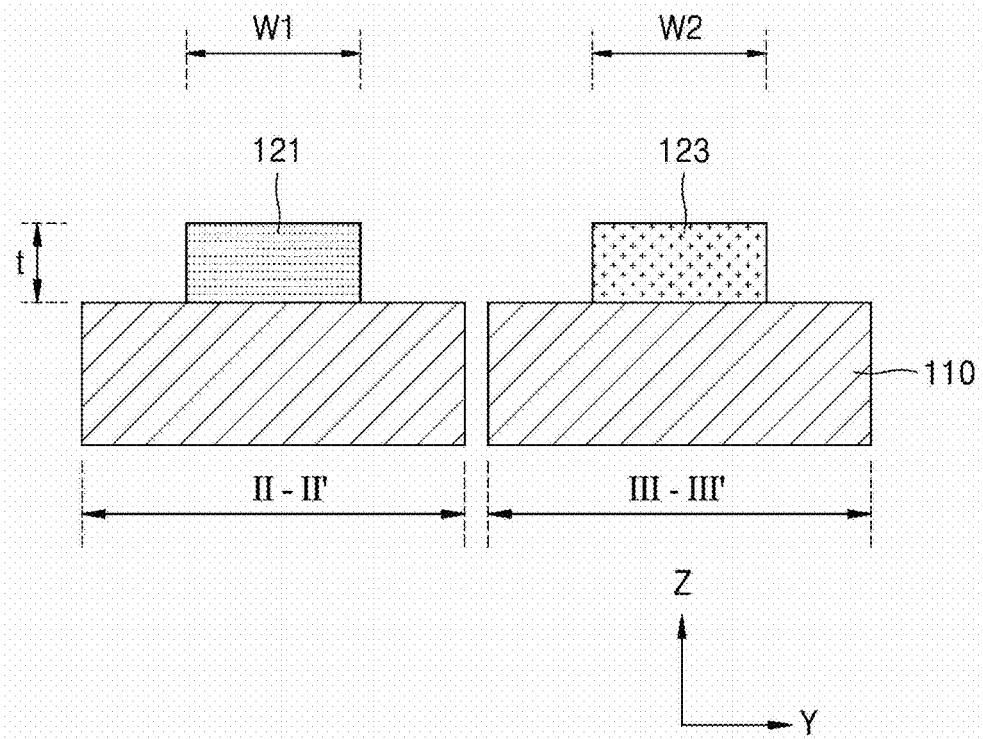
FIG. 2B is a cross-sectional view of the optoelectronic device of FIG. 1 taken along lines II-II' and III-III', respectively.

FIG. 1 is a perspective view of a main portion of an optoelectronic device 100 according to an embodiment of the inventive concept, FIG. 2A is a cross-sectional view of the optoelectronic device 100 of FIG. 1 taken along line I-I', and FIG. 2B is a cross-sectional view of the optoelectronic device 100 of FIG. 1 taken along lines II-II' and III-III', respectively. In FIGS. 1 to 2B, an electrode pad, an electrode, and the like are not shown for convenience of explanation. FIGS. 1 to 2B mainly show a structure 120 connected to the electrode pad, the electrode, and the like as a main portion of the optoelectronic device 100 and operating as a waveguide-integrated optical modulator (or a photodetector).

Referring to FIG. 1, the optoelectronic device 100 may include a substrate 110 and the structure 120.

The substrate 110 may be a bulk silicon substrate. Depending on an embodiment, the substrate 110 may be a bulk silicon substrate doped with a first conductivity type dopant, such as a p-type dopant. However, the disclosure is not limited thereto, and the substrate 110 may be a bulk silicon substrate doped with a second conductivity type dopant such as an n-type dopant.

The structure 120 extending in a first direction (X direction) parallel to an upper surface of the substrate 110 is formed on the substrate 110.

The structure 120 may include an input optical waveguide 121 into which light is input, an active region 123 for modulating or detecting light transmitted from the input optical waveguide 121, and an output optical waveguide 125 for outputting light transmitted from the active region 123.

In detail, the structure 120 may include the active region 123 between the input optical waveguide 121 and the output optical waveguide 125 that are spaced apart from each other in the first direction. Further, the structure 120 may be formed in a mesa shape extending in the first direction, in which one side of the active region 123 is in contact with one side of the input optical waveguide 121 and the other side of the active region 123 is in contact with one side of the output optical waveguide 125.

The input optical waveguide 121, the active region 123, and the output optical waveguide 125 of the structure 120 may have a refractive index greater than that of the substrate 110 so that an optical mode passing through the optoelectronic device 100 may be confined along the structure 120.

Meanwhile, the structure 120 may optionally further include buffer layers 127 between the input optical waveguide 121 and the active region 123, and between the active region 123 and the output optical waveguide 125.

The buffer layers 127 are between the input optical waveguide 121 and the active region 123 in the form of a thin film and between the active region 123 and the output optical waveguide 125, respectively, to alleviate the difference in an effective light refractive index between the respective portions, and to reduce defects in growth of the active region 120. Hereinafter, for convenience of description, a case where the structure 120 includes a buffer layer 127 will be described as an example.

A shape of the structure 120 will be described in more detail with further reference to FIGS. 2A and 2B.

First, referring to FIG. 2A, the input optical waveguide 121 may have a first length L1 in the first direction, the active region 123 may have a second length L2 in the first direction, and the output optical waveguide 125 may have a third length L3 in the first direction. The buffer layers 127 between the input optical waveguide 121 and the active region 123 and between the active region 123 and the output optical waveguide 125 have a fourth length L4 and a fifth length L5 in the first direction, respectively.

The first to third lengths L1 to L3 may be determined according to design requirements of the optoelectronic device 100. However, the second length L2 may be within about 5 μm to about 300 μm to implement optical modulation and an optical detection function of the active region 123, and the first and third lengths L1 and L3 may have free values depending on the design requirements of the optoelectronic device 100 without limitation.

In some embodiments, the first and third lengths L1 and L3 may be substantially equal to each other, but may be different from the second length L2. In more detail, the first and third lengths L1 and L3 may be substantially equal to each other, but may be greater than the second length L2. However, the disclosure is not limited thereto, and the first to third lengths L1 to L3 may be substantially equal to each other. In addition, the first and third lengths L1 and L3 may be different from each other.

The fourth and fifth lengths L4 and L5 may also be determined according to the design requirements of the optoelectronic device 100. However, the fourth and fifth lengths L4 and L5 have relatively small values as compared with the first to third lengths, and may have values within a range of about 0 to 1 μm in order to alleviate the difference in an effective light refractive index and to prevent the occurrence of defects. Meanwhile, the fourth and fifth lengths L4 and L5 may be substantially equal to each other.

Each of the input optical waveguide 121, the active region 123, the output optical waveguide 125, and the buffer layer 127 may have substantially the same length in the third direction (Z direction), that is, a thickness t. Accordingly, an upper surface of each of the input optical waveguide 121, the active region 123, the output optical waveguide 125, and the buffer layer 127 may be located at the same height from the upper surface of the substrate 110 and they may be flush with each other.

Further referring to FIG. 2B, the input optical waveguide 121 may have a length in a second direction (Y direction), that is, a first width W1, and the active region 123 may have a length in the second direction, that is, a second width W2. Meanwhile, although not shown in FIG. 2B, the output optical waveguide 125 may have substantially the same width as the input optical waveguide 121 and/or the active region 123. Furthermore, the buffer layer 127 may also have substantially the same width as the input optical waveguide 121 and/or the active region 123. Hereinafter, for convenience of description, the input optical waveguide 121 and the active region 123 will be mainly described.

The first width W1 and the second width W2 may be substantially equal to each other and may be constant in the second direction. Accordingly, vertical sections perpendicular to the first direction of the input optical waveguide 121 and the active region 123 having the same thickness t may have the same mesa shape with each other. That is, the input optical waveguide 121 and the active region 123 may have symmetrical vertical cross-sectional shapes.

Figure 3A:
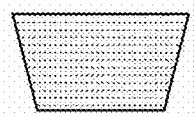
FIGS. 3A to 3D are views for explaining variations of a vertical section of the optoelectronic device of FIG. 1.
Figure 3A:
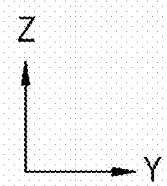
Figure 3B:
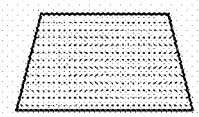
Figure 3B:
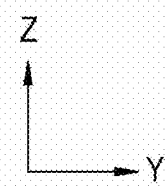

FIGS. 3A to 3D for explaining variations of a vertical section of the optoelectronic device 100 of FIG. 1 will be further described. FIGS. 3A to 3B show only modified shapes of a section perpendicular to the first direction of the input optical waveguide 121, but respective sections perpendicular to the first direction of the active region 123 and the output optical waveguide 125 may also have substantially the same modified shapes as those of the sections perpendicular to the first direction of the input optical waveguide 121.

Further referring to FIGS. 3A to 3D, unlike FIGS. 1 to 2B, a width of the section perpendicular to the first direction of the input optical waveguide 121 may vary in the third direction.

For example, the section perpendicular to the first direction of the input optical waveguide 121 may have a tapered shape in which the width is continuously widened from a lower portion to an upper portion as shown in FIG. 3A, or may have a tapered shape in which the width is continuously narrowed from a lower portion to an upper portion as shown in FIG. 3B.

Figure 3C:
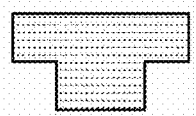
Figure 3C:
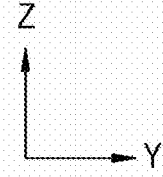
Figure 3D:
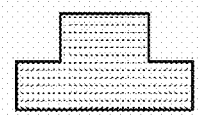
Figure 3D:
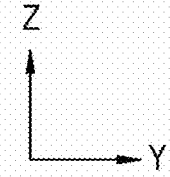

As another example, the section perpendicular to the first direction of the input optical waveguide 121 may have a reverse rib shape in which the width is intermittently widened from a lower portion to an upper portion as shown in FIG. 3C, or may have a rib shape in which the width is intermittently narrowed from a lower portion to an upper portion as shown in FIG. 3D.

As such, when each of the input optical waveguide 121, the active region 123, and the output optical waveguide 125 has a vertical cross-sectional shape in which widths of upper and lower portions are different from each other, only a small portion of an optical mode profile may interfere with each sidewall interface and/or the optical mode can be designed to stay further away from the light-absorbing electrode region so that the benefits such as reduced optical loss and better devices designs including easier processing for contacts may be expected.

Referring again to FIG. 1, the input optical waveguide 121, the active region 123, and the output optical waveguide 125 of the structure 120 may include an identical semiconductor compound, for example, $Ge_xSi_y$.

However, semiconductor compounds included in at least two of the input optical waveguide 121, the active region 123, and the output optical waveguide 125 may have different composition ratios.

For example, the input optical waveguide 121 and the output optical waveguide 125 may include $Ge_{1-x}Si_x$, and the active region 123 may include $Ge_{1-y}Si_y$. Here, x may be greater than or equal to y. In more detail, x may be greater than or equal to about 0.01, but less than about 1, and y may be greater than about 0 but less than or equal to about 0.01.

Meanwhile, the buffer layer 127 may include any one of various insulating materials such as silicon oxide, silicon nitride, and silicon oxynitride, or a combination thereof.

Characteristics of GeSi will be described with reference to FIG. 4.

Figure 4:
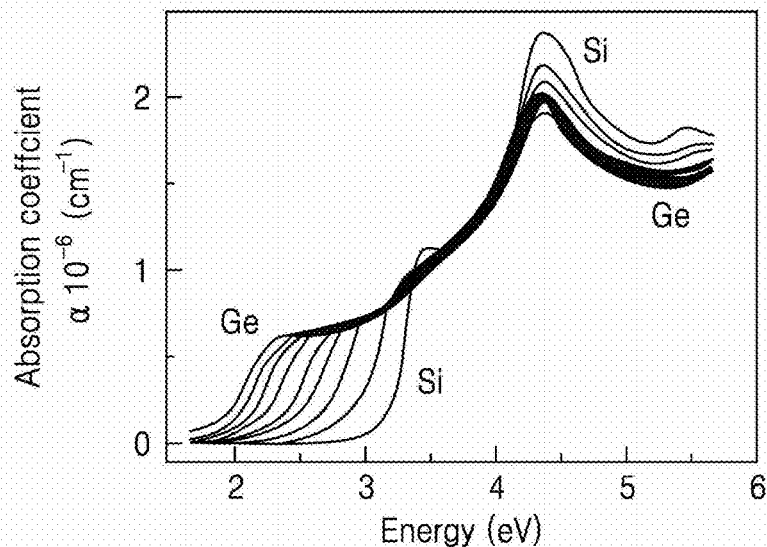
FIG. 4 is a view for explaining characteristics of germanium-silicon (GeSi)
Figure 4:
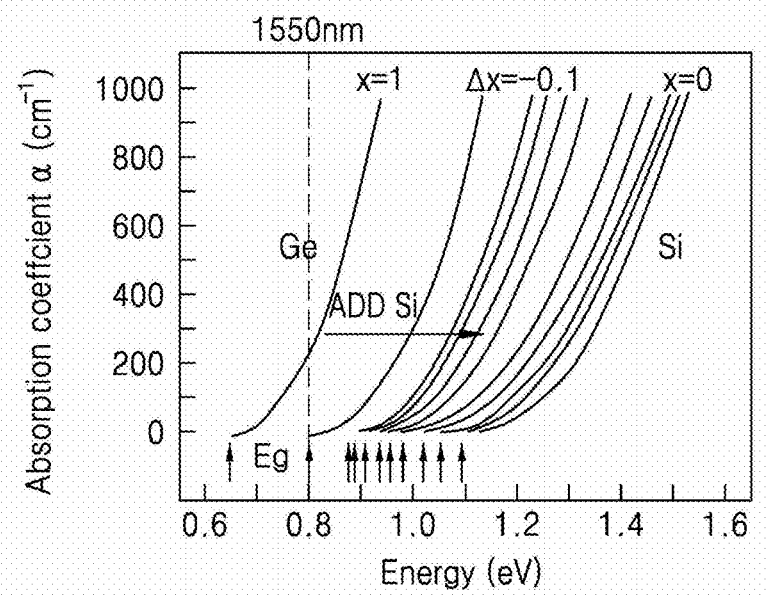

Further referring to FIG. 4, Ge has a band gap energy of about 0.66 eV and a band gap wavelength of about 1870 nm. However, in GeSi obtained by adding a small amount of Si to Gi, a band gap energy increases as the amount of Si increases, and a band gap wavelength decreases accordingly.

As described above, when the amount of Si added to Ge is controlled, GeSi may be used as a photodetector in a region exhibiting a high photon absorption, and in an absorption edge region where an photon absorption coefficient changes rapidly, GeSi may be used as an electroabsorption modulator. Further, in a region where an absorption coefficient is low, GeSi may be used as an optical waveguide which is a passive device.

Based on the characteristics of GeSi, the structure 120 may be realized by integrating the optical waveguides which are passive devices and the active regions which are active devices.

As described above, the optoelectronic device 100 according to an embodiment of the inventive concept includes the input optical waveguide 121, the active region 123, and the output optical waveguide 125 having the same vertical cross-sectional shape as each other and including the same semiconductor compound, and being arranged to be connected to each other or with the buffer layer 127 therebetween.

When having a structure in which the input optical waveguide 121, the active region 123, and the output optical waveguide 125 are arranged to be connected to each other, the optoelectronic device 100 may be greatly reduced in a light loss rate compared to conventional optoelectronic devices in which an optical waveguide and an optical modulator (or photodetector), which include different materials and have different vertical cross-sectional shapes, are coupled to each other.

Furthermore, when the optoelectronic device 100 having a structure in which the buffer layer 127 is interposed among the input optical waveguide 121, the active region 123, and the output optical waveguide 125, the difference in an effective light refractive index due to the difference in a composition ratio of materials constituting the semiconductor compound among the input optical waveguide 121, the active region 123, and the output optical waveguide 125 may be alleviated and defects of the active region 123 may be reduced. Therefore, it is possible to further improve performance of the optoelectronic device 100 as well as to reduce a light loss rate.

Furthermore, by using a bulk silicon substrate without using a silicon-on-insulator (SOI) substrate, a manufacturing cost of the optoelectronic device 100 may be greatly reduced compared to those of conventional optoelectronic devices using the SOI substrate. Moreover, the optoelectronic device 100 is easy to integrate with other Si-based devices such as a complementary metal oxide semiconductor (CMOS), thereby facilitating the implementation of an IC or a chip integrating various optical devices.

Figure 5A:
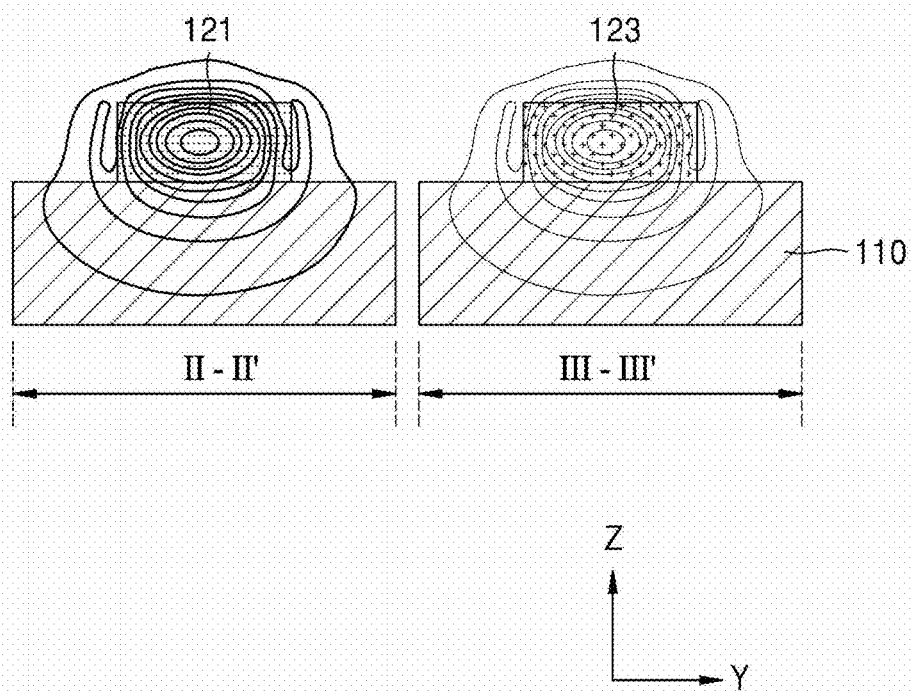
FIG. 5A is a view for explaining a mode profile for an optical waveguide and an active region of FIG. 1.

FIG. 5A is a view for explaining a mode profile for the optical waveguides and the active region of FIG. 1, and FIG. 5B is a result of electromagnetic wave simulation performed on the optoelectronic device of FIG. 1.

Referring to FIGS. 5A and 5B, it can be confirmed that light passing through each of the input optical waveguide 121 and the active region 123 is confined to the input optical waveguide 121 and the active part 123 due to the difference in a refractive index of GeSi constituting the input optical waveguide 121 and the active region 123 and Si constituting the substrate 110, and has an optical mode profile having substantially the same asymmetric shape.

Accordingly, it is possible to effectively realize a GeSi-based passive/active optical device directly on a bulk silicon substrate without an underlying cladding material such as the buried oxide layer of the SOI substrate, and the optical loss may be minimized between the input optical waveguide 121 which is a passive device and the active region 123 which is an active device.

FIGS. 6A to 6F are cross-sectional views of an optoelectronic device in a process sequence in order to explain a method of manufacturing the optoelectronic device of FIG. 1.

FIGS. 6A to 6F shows the cross-sectional views of the optoelectronic device 100 taken along lines I-I', II-II', and III-III' of FIG. 1. FIGS. 6A to 6F to is described with reference to FIGS. 1 to 2B and repeated descriptions thereof will not be given herein.

Figure 6A:
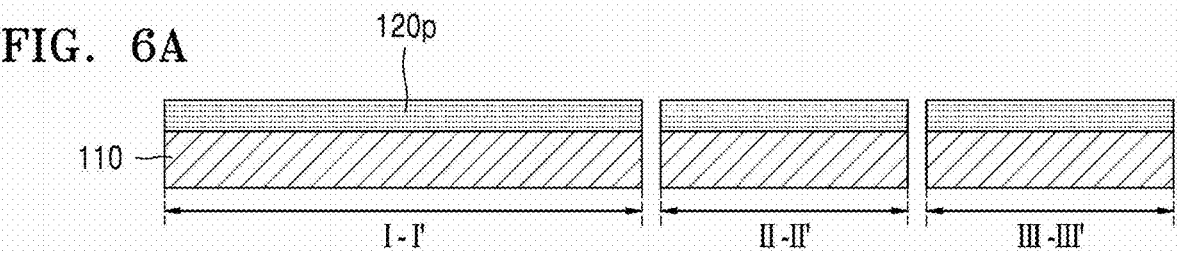
FIGS. 6A to 6F are cross-sectional views of an optoelectronic device in a process sequence in order to explain a method of manufacturing the optoelectronic device of FIG. 1.

First, a preliminary layer 120p including a first semiconductor compound such as Ge1-xSix is formed on the substrate 110 (FIG. 6A).

For example, the preliminary layer 120p may be formed through a chemical vapor deposition (CVD) process.

Figure 6B:
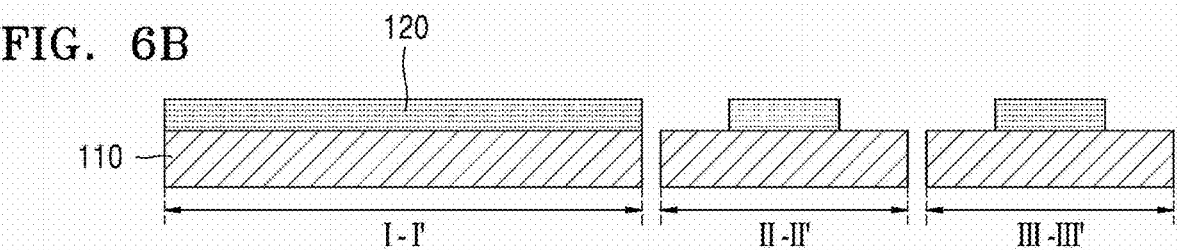

A portion of the preliminary layer 120p is removed to form the structure 120 extending in the first direction (FIG. 6B).

For example, the structure 120 extending in the first direction may be formed by forming a mask layer on an upper surface of the preliminary layer 120p and then patterning the mask layer, and etching a portion of the preliminary layer 120p by using the patterned mask layer as an etching mask to remove the remaining mask layer.

Figure 6C:
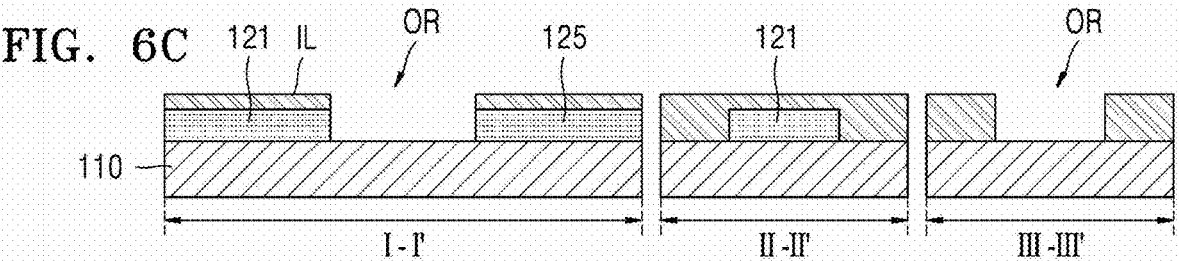

An insulating layer IL is formed to cover an upper surface of the substrate 110 exposed in both sides of the structure 120 and the structure 120, and the input optical waveguide 121 and the output optical waveguide 125 are defined by removing a portion of the insulating layer IL and the structure such that a portion of the upper surface of the substrate 110 and an inner wall of the structure 120 are exposed (FIG. 6C).

For example, the insulating layer IL that covers the substrate 110 may be formed using a chemical vapor deposition (CVD) process or an atomic layer deposition (ALD) process. Subsequently, an opening OR for exposing a portion of the upper surface of the substrate 110 and the inner wall of the structure 120 may be formed by forming a mask layer on an upper surface of the insulating layer IL and then patterning the mask layer, and etching a portion of the insulating layer IL and the structure 120 by using the patterned mask layer as an etching mask. Thereby, both ends of the structure 120 interrupted by the opening OR may be defined as the input optical waveguide 121 and the output optical waveguide 125, respectively. A width of the opening OR in the second direction may be substantially the same as widths of the input and output optical waveguides 121 and 125 in the second direction.

Figure 6D:
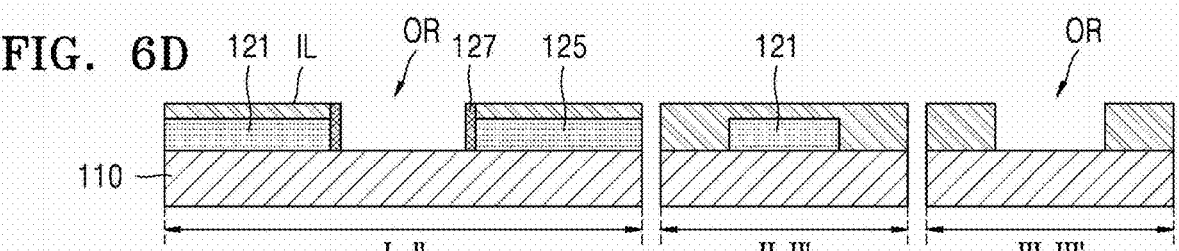

The buffer layer 127 is formed to cover the inner wall of the structure 120 exposed in the opening OR and expose the upper surface of the substrate 110 (FIG. 6D).

For example, a preliminary buffer layer covering the inner surface of the substrate 110, the insulating layer IL, and the opening OR may be formed by using the CVD process, the ALD process, or the like. Subsequently, the buffer layer 127 may be formed by removing portions except for the preliminary buffer layer on the inner wall surface of the structure 120 exposed in the opening OR, that is, a sidewall of the input optical waveguide 121 and a sidewall of the output optical waveguide 125 that are exposed in the opening OR, by using an anisotropic etching process.

Figure 6E:
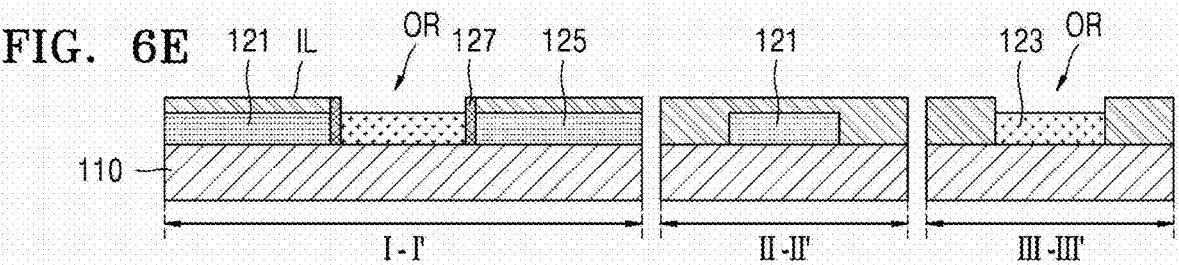

The active region 123 including a second semiconductor compound such as $Ge_{1-y}Si_y$, is formed so as to cover a portion of the upper surface of the substrate 110 and at least a portion of the buffer layer 127 that are exposed in the opening OR (FIG. 6E).

For example, the active region 123 covering the portion of the upper surface of the substrate 110 and the at least a portion of the buffer layer 127 may be formed by growing the second semiconductor compound from the portion of the upper surface of the substrate 110 exposed in the opening OR such that the opening OR is filled, using a selective Epitaxial Growth (SEG) process.

Here, since the input optical waveguide 121 and the output optical waveguide 125 are covered by the buffer layer 127 and are not exposed in the opening OR, the second semiconductor compound is not grown by seeding with the input optical waveguide 121 and the output optical waveguide 125. This makes it possible to obtain a high-quality active region 123 with minimized crystal defects.

Meanwhile, depending on an embodiment, the forming of the buffer layer 127 (FIG. 6D) may be omitted. When the buffer layer 127 is omitted, the active region 123 is formed by growing the second semiconductor compound so as to cover the portion of the upper surface of the substrate 110 and the inner wall of the structure 120 that are exposed in the opening OR.

Figure 6F:
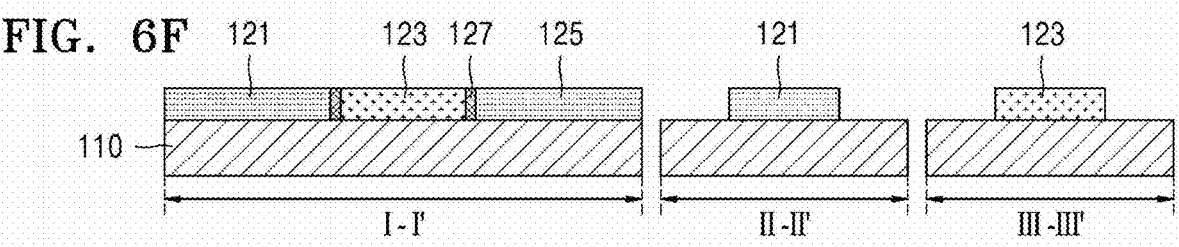

The upper surface of the structure 120 is planarized by removing an insulating layer IL remaining on the portion of the upper surface of the substrate 110, the input optical waveguide 121, and upper portion/sidewall of the output optical waveguide 125 (FIG. 6F).

For example, the remaining insulating layer IL may be removed using an etching process and the upper surface of the structure 120 may be planarized by using a chemical mechanical planarization process so that the input optical waveguide 121, the active region 123, the output optical waveguide 125, and the buffer layer 127 may have substantially the same thickness.

Meanwhile, depending on an embodiment, the removal of the insulating layer IL and the planarization of the structure 120 may be omitted in order to perform a subsequent process for forming an electrode pad, an electrode, and the like with the insulating layer IL remaining.

As described above, according to the method of manufacturing the optoelectronic device according to an embodiment of the inventive concept, the optoelectronic device 100 in which the input optical waveguide 121, the active region 123, and the output optical waveguide 125, which include GeSi and have substantially the same section, are continuously arranged may be manufactured on the substrate 110 composed of a bulk silicon substrate through a simplified process, thereby greatly reducing the manufacturing cost.

Figure 7:
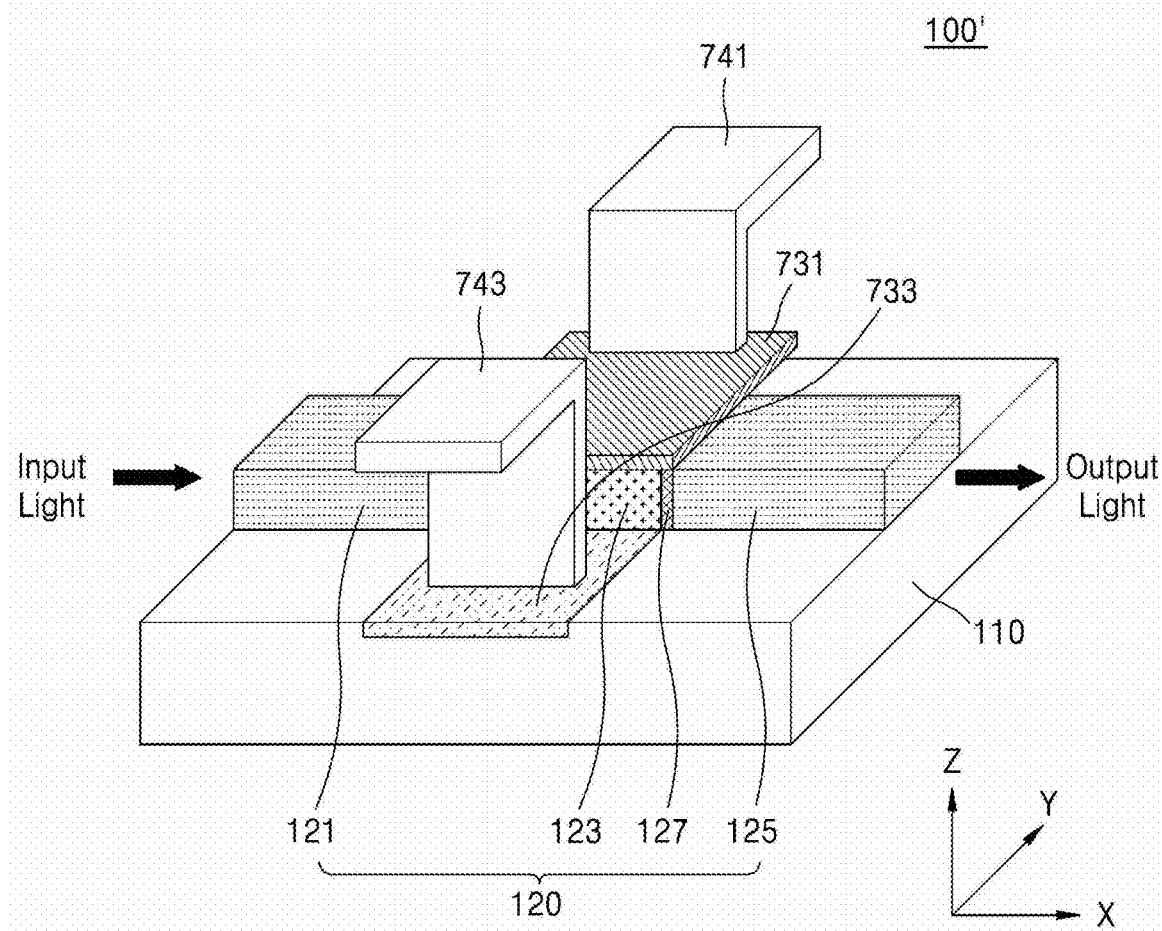
FIGS. 7 and 8 are perspective views for illustrating electrode implementation of optoelectronic devices according to embodiments of the inventive concept.
Figure 8:
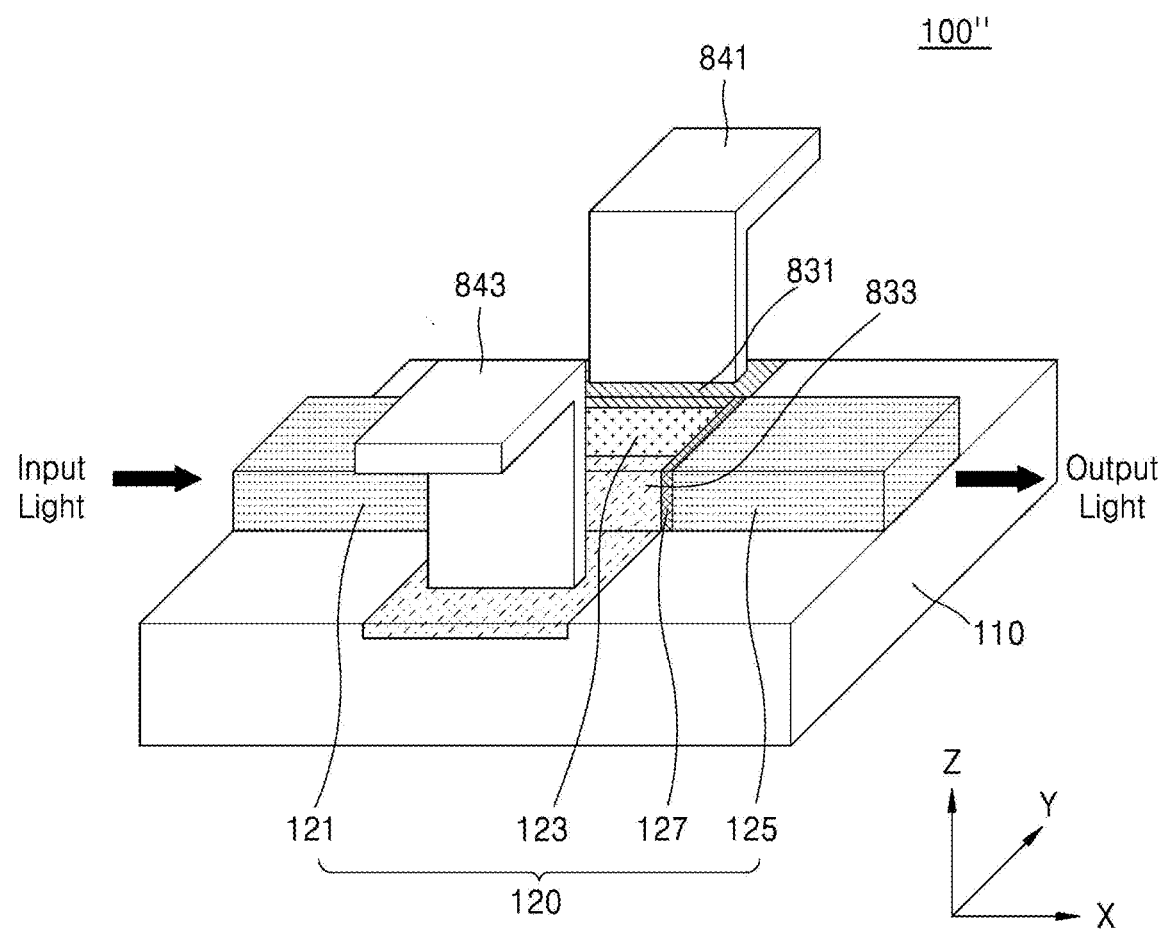

FIGS. 7 and 8 are perspective views for illustrating electrode implementation of optoelectronic devices according to embodiments of the inventive concept. In FIGS. 7 and 8, the same reference numerals as in FIG. 1 denote the same elements, and descriptions thereof will not be given herein, and only the differences from FIG. 1 will be mainly described. Meanwhile, in FIGS. 7 and 8, an upper insulating layer to cover the substrate 110 and components on the substrate 110 are omitted for convenience of explanation. The upper insulating layer may include any one of various insulating materials such as silicon oxide, silicon nitride, and silicon oxynitride, or a combination thereof. Hereinafter, a detailed description of the upper insulating layer will not be given herein for convenience of explanation.

First, referring to FIG. 7, an optoelectronic device 100' may further include first and second contact electrodes 731 and 733 and first and second extension electrodes 741 and 743 for vertically applying a bias voltage to both ends of the active region 123 of the structure 120 or for detecting light passing through the active region 123 of the structure 120.

The first contact electrode 731 may have a structure that covers an upper surface of the active region 123 of the structure 120 and extends in the second direction (Y direction) so that one end protrudes from one sidewall of the active region 123.

The first contact electrode 731 may include a polycrystalline silicon material doped with the first conductivity type dopant or the second conductivity type dopant, and may have a multilayer structure in which the above-described materials are sequentially stacked.

The second contact electrode 733 may have a structure in which a portion of the upper surface is in contact with a lower surface of the active region 123 in the substrate 110 but the other portion of the upper surface is exposed as the second contact electrode 733 extends in the second direction (Y direction).

The second contact electrode 733 may be doped with the first conductivity type dopant or the second conductivity type dopant but may be doped with a conductivity type dopant opposite to that of the first contact electrode 731.

The first extension electrode 741 may be on one end of the first contact electrode 731 protruding from one sidewall of the active region 123 and the second extension electrode 743 may be on the other side of the upper surface of the exposed second contact electrode 733.

The first and second extension electrodes 741 and 743 may include a metal material such as gold, copper, platinum, molybdenum, or palladium.

Meanwhile, depending on an embodiment, the second contact electrode 733 may be omitted. For example, when the substrate 110 is heavily doped with the first conductivity type dopant or the second conductivity type dopant, the second contact electrode 733 may be omitted. In this case, the second electrode 743 may be directly on the upper surface of the substrate 110.

Next, referring to FIG. 8, an optoelectronic device 100" may further include first and second contact electrodes 831 and 833 and first and second extension electrodes 841 and 843 for horizontally applying a bias voltage to both ends of the active region 123 of the structure 120 or for detecting light passing through the active region 123 of the structure 120.

The first contact electrode 831 may be a region extending from one side of the active region 123 of the structure 120 to one surface of the substrate 110 and doped with the first conductivity type dopant or the second conductivity type dopant.

The second contact electrode 833 may be a region extending from the other side of the active region 123 of the structure 120 to the other surface of the substrate 110 and doped with the first conductivity type dopant or the second conductivity type dopant. However, the second contact electrode 833 may be doped with a conductivity type dopant opposite to that of the first contact electrode 831.

The first and second extension electrodes 841 and 843 may be on the first contact electrode 831 and second contact electrode 833 on the substrate 110, respectively, and may include a metal such as gold, copper, platinum, and the like.

Figure 9:
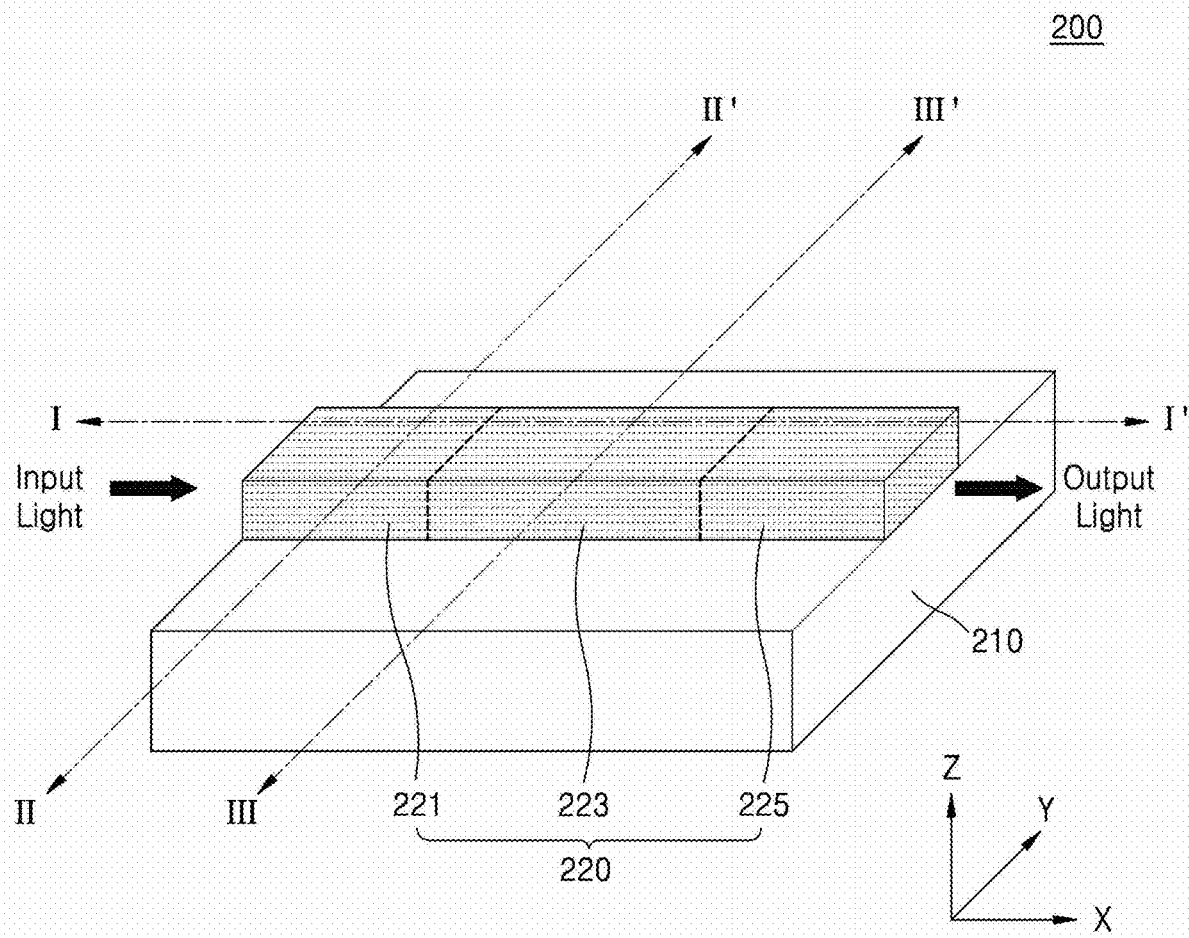
FIG. 9 is a perspective view of a main portion of an optoelectronic device according to another embodiment of the inventive concept.
Figure 10A:
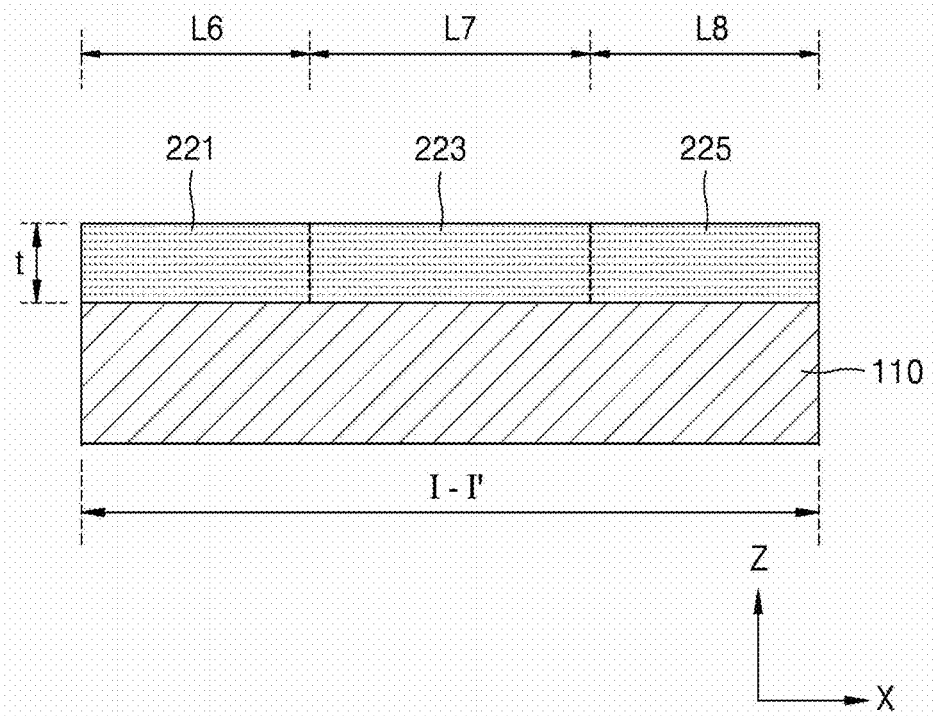
FIG. 10A is a cross-sectional view of the optoelectronic device of FIG. 9 taken along line I-I'.
Figure 10B:
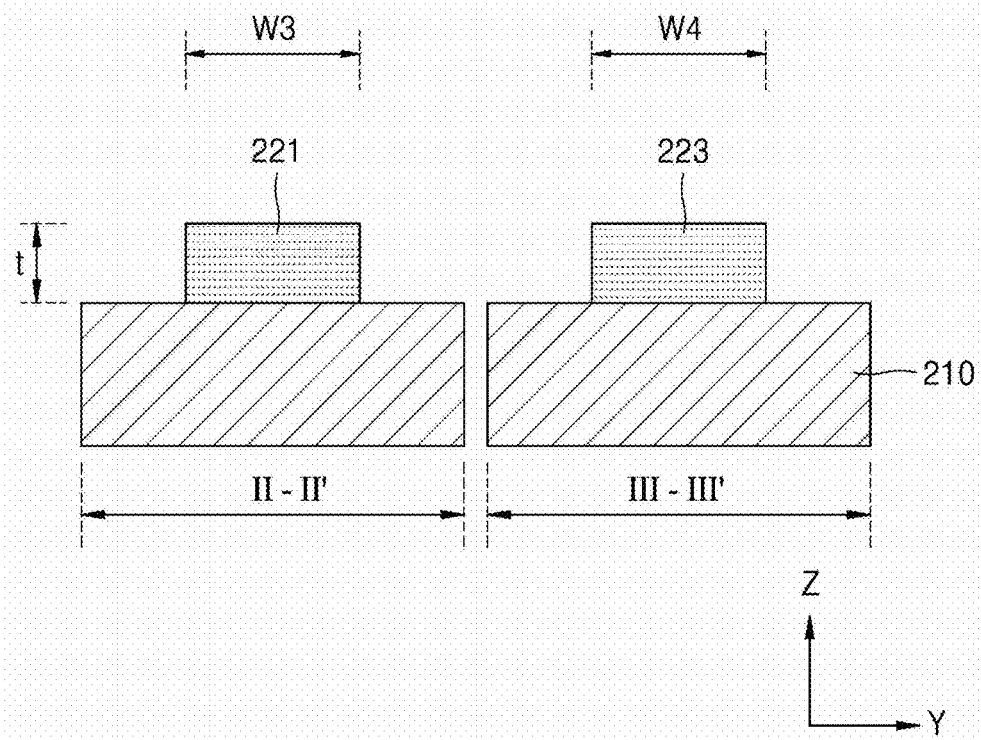
FIG. 10B is a cross-sectional view of the optoelectronic device of FIG. 9 taken along lines II-II' and III-III', respectively.

FIG. 9 is a perspective view of a main portion of an optoelectronic device according to another embodiment of the inventive concept, FIG. 10A is a cross-sectional view of the optoelectronic device of FIG. 9 taken along line I-I', and FIG. 10B is a cross-sectional view of the optoelectronic device of FIG. 9 taken along lines II-II' and III-III', respectively. An optoelectronic device 200 shown in FIG. 9 is a modified embodiment of the optoelectronic device 100 shown in FIG. 1. In FIG. 9, the same reference numerals as in FIG. 1 denote the same elements, and descriptions thereof will not be given herein, and only the differences from FIG. 1 will be mainly described.

Referring to FIG. 9, the optoelectronic device 200 may include a substrate 210 and a structure 220.

The substrate 210 may be a bulk silicon substrate.

The structure 220 extending in the first direction (X direction) parallel to an upper surface of the substrate 210 is formed on the substrate 210.

The structure 220 may include an input optical waveguide 221 into which light is input, an active region 223 for modulating or detecting light transmitted from the input optical waveguide 221, and an output optical waveguide 225 for outputting light transmitted from the active region 223.

In detail, the structure 220 may include the active region 223 between the input optical waveguide 221 and the output optical waveguide 225 that are spaced apart from each other in the first direction. Further, the structure 220 may be formed in a mesa shape, in which one side of the active region 223 is in contact with one side of the input optical waveguide 221 and the other side of the active region 223 is in contact with one side of the output optical waveguide 225 and extends in the first direction.

The input optical waveguide 221, the active region 223, and the output optical waveguide 225 of the structure 220 may have a refractive index greater than that of the substrate 210 so that an optical mode passing through the optoelectronic device 200 may be confined along the structure 220.

A shape of the structure 220 will be described in more detail with further reference to FIGS. 10A and 10B.

First, referring to FIG. 10A, the input optical waveguide 221 may have a sixth length L6 in the first direction, the active region 223 may have a seventh length L7 in the first direction, and the output optical waveguide 225 may have an eighth length L8 in the first direction.

The sixth to eighth lengths L6 to L8 may be determined according to design requirements of the optoelectronic device 200. However, the seventh length L7 may be within about 5 μm to about 300 μm to implement optical modulation and an optical detection function of the active region 223, and the sixth and eighth lengths L6 and L8 may have free values depending on the design requirements of the optoelectronic device 200 without limitation.

In some embodiments, the sixth and eighth lengths L6 and L8 may be substantially equal to each other, but may be different from the seventh length L7. In more detail, the sixth and eighth lengths L6 and L8 may be substantially equal to each other, but may be less than the seventh length L7. However, the disclosure is not limited thereto, and the sixth to eighth lengths L6 to L8 may be substantially equal to each other. Furthermore, the sixth and eighth lengths L6 and L8 may be different from each other.

The input optical waveguide 221, the active region 223, and the output optical waveguide 225 may have substantially the same thickness as each other.

Further referring to FIG. 10B, the input optical waveguide 221 may have a length in the second direction (Y direction), that is, a third width W3, and the active region 223 may have a length in the second direction, that is, a fourth width W4. Meanwhile, although not shown in FIG. 10B, the output optical waveguide 225 may have substantially the same width as the input optical waveguide 221 and/or the active region 223. Hereinafter, for convenience of description, the input optical waveguide 221 and the active region 223 will be mainly described.

The third width W3 and the fourth width W4 may be substantially equal to each other and may be constant in the second direction. Accordingly, vertical cross sections perpendicular to the first direction of the input optical waveguide 221 and the active region 223 having the same thickness t may have the same mesa shape with each other. That is, the input optical waveguide 221 and the active region 223 may have symmetrical vertical cross-sectional shapes.

Meanwhile, a section of each of the input optical waveguide 221, the active region 223, and the output optical waveguide 225 perpendicular to the first direction may have any one of a tapered shape, a reverse rib shape, and a rib shape.

Referring again to FIG. 9, the structure 220 may include a semiconductor compound such as GeSi. That is, the input optical waveguide 121, the active region 123, and the output optical waveguide 125 may include the same semiconductor compound.

In the structure 220 unlike the structure 120 described with reference to FIG. 1, the semiconductor compounds included in the input optical waveguide 221, the active region 223, and the output optical waveguide 225 may have the same composition ratio.

For example, each of the input optical waveguide 221, the active region 223, and the output optical waveguide 225 may include $Ge_{1-z}Si_z$, where z is greater than or equal to about zero and less than or equal to about 0.2.

As described above, the optoelectronic device 200 according to an embodiment of the inventive concept includes the input optical waveguide 221, the active region 223, and the output optical waveguide 225 having the same vertical cross-sectional shape as each other and including a semiconductor compound having the same composition ratio, and being arranged to be connected to each other.

Since the optoelectronic device 200 includes the input optical waveguide 221, the active region 223, and the output optical waveguide 225 including the semiconductor compound having the same composition ratio, a process for forming the active region separately is not necessary as shown in FIGS. 6A to 6F, so that a manufacturing process may be greatly simplified and the problem of discrepancy between joint surfaces may be prevented. Thus, there is no discrepancy problem between the joint surfaces of the input optical waveguide 221, the active region 223, and the output optical waveguide 225, thereby maximizing an optical loss reduction effect and maximizing the reduction in manufacturing cost.

As the optoelectronic device 200 uses a bulk silicon substrate like the optoelectronic device 100 described with reference to FIG. 1 and the like, integration with other Si-based devices such as CMOS is easy.

Although not shown, the optoelectronic device 200 may also have a vertical or horizontal electrode structure as in the embodiments shown in FIGS. 7 and 8.

According to an optoelectronic device and a method of manufacturing the optoelectronic device according to embodiments of the inventive concept, the optoelectronic device has a structure in which an input optical waveguide, an active region, and an output optical waveguide, which include GeSi and have substantially the same cross-sectional shape, are continuously arranged on a bulk silicon substrate of a low cost. As a result, optical loss due to coupling as well as optical loss due to characteristics of the device itself may be minimized and the manufacturing cost may be lowered because the optoelectronic device is manufactured by a simplified process.

Furthermore, according to the optoelectronic device and the method of manufacturing the optoelectronic device according to embodiments of the inventive concept, as the input optical waveguide, the active region, and the output optical waveguide are directly formed on the bulk silicon substrate, the optoelectronic device is easy to integrate with other Si-based devices such as a CMOS formed on a bulk silicon substrate instead of a silicon-on-insulator (SOI) substrate.

Numerous modifications and adaptations will be readily apparent to one of ordinary skill in the art without departing from the scope of the disclosure.

In this regard, the present embodiments may have different forms and should not be construed as being limited to the descriptions set forth herein.

While the disclosure has been particularly shown and described with reference to embodiments thereof, it will be understood that various changes in form and details may be made therein without departing from the scope of the following claims.

What is claimed is:

1. An optoelectronic device comprising first and second optical waveguides arranged on a bulk silicon substrate to be spaced apart from each other in a first direction parallel to an upper surface of the bulk silicon substrate;
   an active region interposed between the first and second optical waveguides on the bulk silicon substrate; and
   buffer layers interposed between one side of the active region and the first optical waveguide and between the other side of the active region and the second optical waveguide,
   wherein the first and second optical waveguides and the active region comprise germanium-silicon (GeSi) alloy,
   wherein at least one of the first and second optical waveguides and the active region comprise GeSi alloy of different composition ratios, respectively, and
   wherein the first and second optical waveguides and the active region are directly disposed on the bulk silicon substrate.

2. The optoelectronic device of claim 1, wherein Si content of at least one of the first and second optical waveguides is greater than Si content of the active region.

3. The optoelectronic device of claim 1, wherein at least one of the first and second optical waveguides and the active region comprise GeSi alloy having the same composition ratio.

4. The optoelectronic device of claim 1, wherein a length of the active region in the first direction is about 5 μm to about 300 μm.

5. The optoelectronic device of claim 1, wherein a cross section perpendicular to the first direction of at least one of the first and second optical waveguides is symmetrical with a cross section perpendicular to the first direction of the active region.

6. The optoelectronic device of claim 1, wherein, in a cross section perpendicular to the first direction of each of at least one of the first and second optical waveguides and the active region, a width of the cross section in a second direction orthogonal to the first direction is constant in a third direction perpendicular to the upper surface of the bulk silicon substrate.

7. The optoelectronic device of claim 1, further comprising:
   a first contact electrode in contact with an upper surface of the active region and connected to a first extension electrode for applying a bias voltage to the active region or for detecting light passing through the active region.

8. The optoelectronic device of claim 7, further comprising:
   a second contact electrode, which is formed between the bulk silicon substrate and the active region and connected to a second extension electrode for applying a bias voltage to the active region or for detecting light passing through the active region.

9. The optoelectronic device of claim 1, further comprising:
   first and second contact electrodes extended from each side of the active region to the bulk silicon substrate and connected to first and second extension electrodes for applying a bias voltage to the active region or for detecting light passing through the active region.

* * * * *